(12) United States Patent
Mildt et al.

(10) Patent No.: US 9,561,739 B2
(45) Date of Patent: Feb. 7, 2017

(54) METHOD AND ATTACHMENT ELEMENT FOR MOUNTING A VEHICLE SEAT

(75) Inventors: Helmut Richard Mildt, Lindlar (DE); Dieter Klimars, Mechernich (DE)

(73) Assignee: C. Rob. Hammerstein GmbH & Co. KG, Solingen (DE)

( * ) Notice: Subject to any disclaimer, the term of this patent is extended or adjusted under 35 U.S.C. 154(b) by 280 days.

(21) Appl. No.: 14/358,152

(22) PCT Filed: Sep. 13, 2012

(86) PCT No.: PCT/EP2012/067951
§ 371 (c)(1),
(2), (4) Date: Sep. 22, 2014

(87) PCT Pub. No.: WO2013/072090
PCT Pub. Date: May 23, 2013

(65) Prior Publication Data
US 2015/0026954 A1 Jan. 29, 2015

(30) Foreign Application Priority Data

Nov. 16, 2011 (DE) .......................... 10 2011 086 504
Feb. 21, 2012 (DE) .......................... 10 2012 202 654

(51) Int. Cl.
*B60N 2/015* (2006.01)
*B60N 2/68* (2006.01)
(Continued)

(52) U.S. Cl.
CPC ............... *B60N 2/015* (2013.01); *B60N 2/682* (2013.01); *F16B 5/0233* (2013.01); *F16B 21/02* (2013.01);
(Continued)

(58) Field of Classification Search
CPC .......... B60N 2/015; B60N 2/682; F16B 21/02; F16B 5/0233; Y10T 403/595; Y10T 29/49947
See application file for complete search history.

(56) References Cited

U.S. PATENT DOCUMENTS

| 5,395,194 A | 3/1995 | Johnson et al. |
| 7,959,214 B2 | 6/2011 | Salhoff |

(Continued)

FOREIGN PATENT DOCUMENTS

| CN | 1620557 A | 5/2005 |
| CN | 101324246 A | 12/2008 |

(Continued)

OTHER PUBLICATIONS

Office Action dated Jul. 28, 2015, in corresponding Chinese application No. 201280056400.3, 8 pages.
(Continued)

*Primary Examiner* — John C Hong
(74) *Attorney, Agent, or Firm* — Foley & Lardner LLP

(57) ABSTRACT

An attachment element for mounting a vehicle seat on a vehicle structure includes a sleeve, at one end of which a lever element is arranged, and an element which can be a hollow cylinder and which has at least two wing-like extensions lying opposite one another, and which at least partially surrounds the sleeve. Also, a method is described for mounting a vehicle seat on a vehicle structure by using at least one fastening element.

10 Claims, 5 Drawing Sheets

Figure 1:
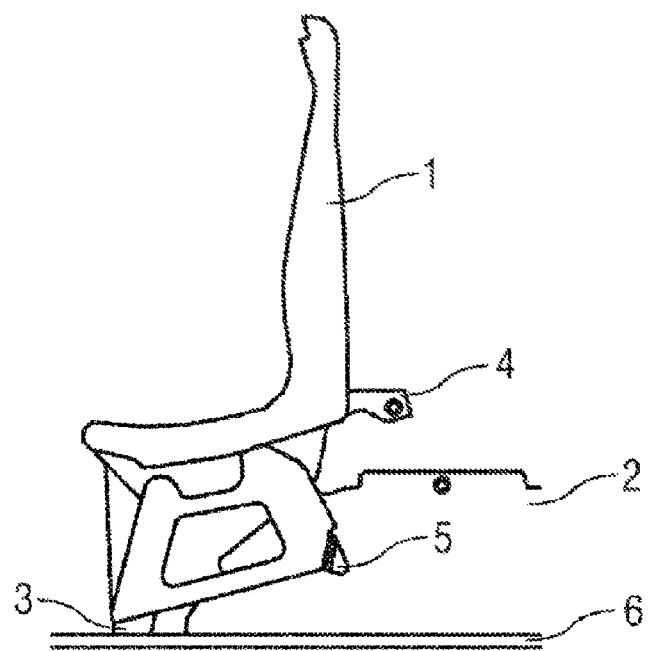

(51) Int. Cl.
*F16B 5/02* (2006.01)
*F16B 21/02* (2006.01)

(52) U.S. Cl.
CPC ....... *Y10T 29/49947* (2015.01); *Y10T 403/595* (2015.01)

(56) References Cited

U.S. PATENT DOCUMENTS

| | | | |
|---|---|---|---|
| 8,240,966 B2 | 8/2012 | Figge et al. | |
| 8,864,432 B2 | 10/2014 | Figge et al. | |
| 2007/0009342 A1 | 1/2007 | Figge et al. | |
| 2008/0304907 A1* | 12/2008 | Figge | F16B 5/0233 403/408.1 |

FOREIGN PATENT DOCUMENTS

| | | |
|---|---|---|
| CN | 101500835 A | 8/2009 |
| CN | 102138011 A | 7/2011 |
| DE | 2020050 10 873 U1 | 10/2005 |
| DE | 2020070 08 152 U1 | 9/2007 |
| DE | 1020060 30 029 A1 | 1/2008 |
| DE | 1020080 62 894 A1 | 6/2010 |
| EP | 0 415 505 A2 | 8/2009 |
| FR | 2135463 A2 | 12/1972 |
| JP | 2008-304063 | 12/2008 |
| WO | WO-2010/066363 A1 | 6/2010 |

OTHER PUBLICATIONS

International Search Report in PCT/EP2012/067951.
Office Action dated Jun. 12, 2012 in corresponding German Patent Application No. 10 2012 202 654.1.
Office Action dated May 29, 2015 in corresponding Korean Application No. 10-2014-7016398 and English translation, 14 pages.

* cited by examiner

METHOD AND ATTACHMENT ELEMENT FOR MOUNTING A VEHICLE SEAT

CROSS REFERENCE TO RELATED APPLICATIONS

The present application is a U.S. National Stage of International Application No. PCT/EP2012/067951 filed on Sep. 13, 2012, which claims the benefit of German Patent Application No. 10 2011 086 504.7 filed on Nov. 16, 2011 and German Patent Application No. 10 2012 202 654.1 filed on Feb. 21, 2012, the entire disclosures of all of which are Incorporated herein by reference.

DESCRIPTION

The invention relates to an attachment element for mounting a vehicle seat on a vehicle structure as claimed in the preamble of claim 1. The invention further relates to a method for mounting a vehicle seat on a vehicle structure as claimed in the preamble of claim 8.

Many different attachment elements for mounting a vehicle seat on a vehicle structure, for example conventional screws, are known from the prior art. Many attachment methods, for example by means of plug connections and/or latching connections, are also known.

Attachment elements for axial tolerance compensation when mounting two components are disclosed in DE 10 2008 062 894 A1, DE 10 2006 030 029 A 1 and FR 2 135 463 A2.

It is the object of the present invention to specify an improved method and an improved attachment element for mounting a vehicle seat on a vehicle structure.

With regard to the attachment element for mounting a vehicle seat on a vehicle structure, the object is achieved by the features set forth in claim 1.

With regard to the method for mounting a vehicle seat on a vehicle structure, the object is achieved by the features set forth in claim 7.

Advantageous developments of the invention form the subject matter of the sub-claims.

The attachment element for mounting a vehicle seat on a vehicle structure according to the invention comprises a sleeve, at one end of which a lever element is arranged, and an element which is configured substantially in the manner of a hollow cylinder, which comprises at least two wing-like extensions opposing one another and which at least partially surrounds the sleeve. Such an attachment element, therefore, advantageously permits tolerance compensation when attaching the vehicle seat in the vehicle transverse axis, the vehicle vertical axis and/or the vehicle longitudinal axis.

According to the invention, the element configured in the manner of a hollow cylinder is held positively and/or non-positively on the sleeve by means of at least two retaining tabs opposing one another. As a result, the element configured in the manner of a hollow cylinder and the sleeve may be formed as stamped sheet metal parts which are able to be produced in a cost-effective manner.

Particularly expediently, the retaining tabs are integrally formed or shaped on the front face of the sleeve and are bent back outwardly at an angle of 90 degrees or almost 90 degrees relative to the sleeve axis.

In an advantageous embodiment, the retaining tabs engage positively in corresponding recesses in the element configured in the manner of a hollow cylinder and outwardly protrude over the element. In this case, the positive connection between the retaining tabs and the recesses permits in a simple manner anti-twist protection between the element configured in the manner of a hollow cylinder and the sleeve, and the portions of the retaining tabs protruding over the element configured in the manner of a hollow cylinder form a stop surface.

In a further advantageous embodiment, an intermediate space is formed between the lever element and the element configured in the manner of a hollow cylinder, said intermediate space being configured so as to correspond to a material thickness of a retaining element of the vehicle seat.

In an expedient embodiment, for the positive and/or non-positive arrangement of the lever element on the sleeve, portions are integrally formed or shaped on the end face of the sleeve and are bent back outwardly at an angle of 90 degrees or almost 90 degrees relative to a sleeve axis.

The lever element is preferably configured to be substantially disk-shaped and on the outer periphery has a lever-like extension by means of which it is able to be rotated manually or automatically.

In the method for mounting a vehicle seat on a vehicle structure by means of at least one attachment element, when arranging or mounting the vehicle seat in the vehicle, the attachment element according to the invention is arranged in a first position in which an element configured in the manner of a hollow cylinder with wing-like extensions is arranged in a correspondingly shaped recess of the retaining element of the vehicle seat, wherein retaining tabs of a sleeve of the attachment element bear against a retaining element of the vehicle seat.

For the transition from the first position into a second position, according to the arrangement of the vehicle seat in the vehicle, the attachment element is displaced in the vehicle transverse direction toward the vehicle structure into the second position until the attachment element bears on its front face against the vehicle structure, wherein the element configured in the manner of a hollow cylinder with the wing-like extensions is moved completely out of the recess of the retaining element of the vehicle seat so that the recess is located in the intermediate space between the lever element and the element configured in the manner of a hollow cylinder and the lever element bears at least partially against the retaining element of the vehicle seat.

The attachment element is rotated from the second position by means of the lever element manually or automatically into a third position, wherein the wing-like extensions bear at the end face against the retaining element of the vehicle seat, so that a return movement of the attachment element in the vehicle transverse direction is prevented.

Particularly advantageously, therefore, a vehicle seat already fixed at its front face to the vehicle structure may be arranged in the vehicle by a pivoting movement and subsequently by the displacement of the attachment element in the vehicle transverse direction may be attached at its rear end to the vehicle structure.

Figure 2:
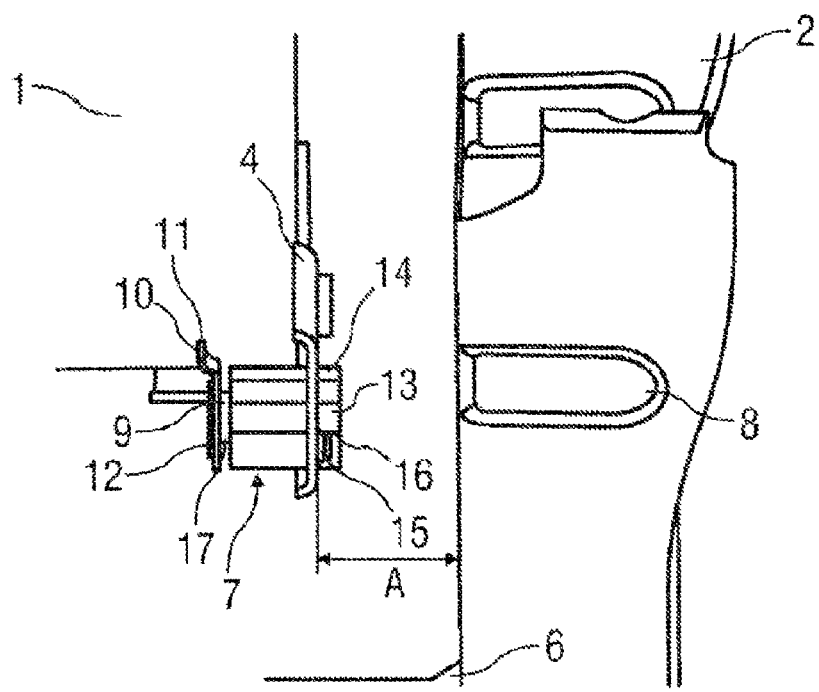
Figure 3:
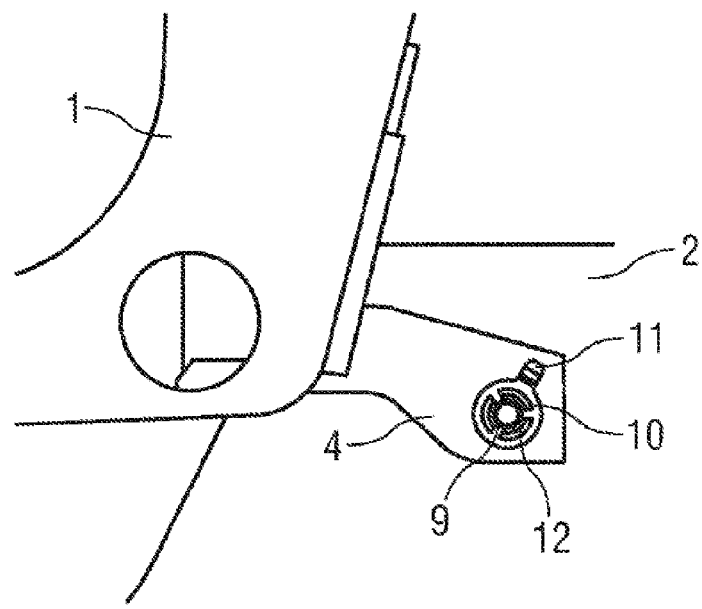
Figure 4:
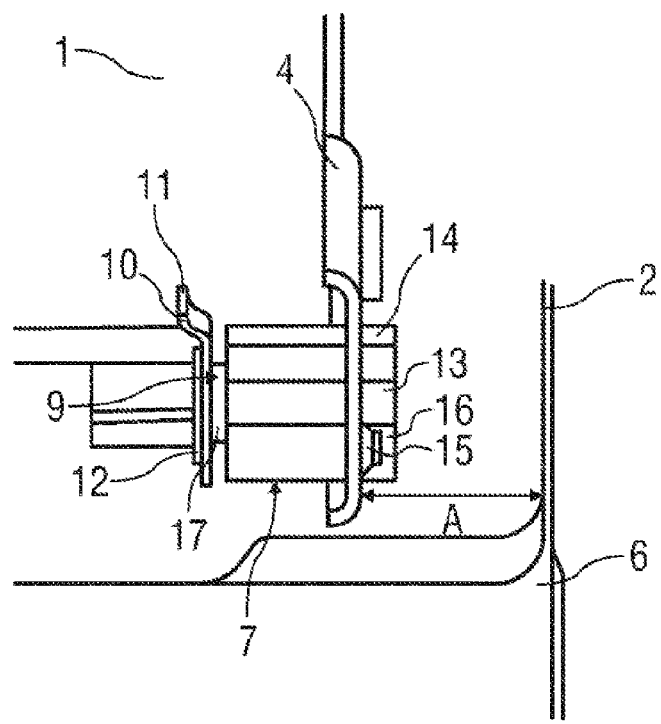
Figure 5:
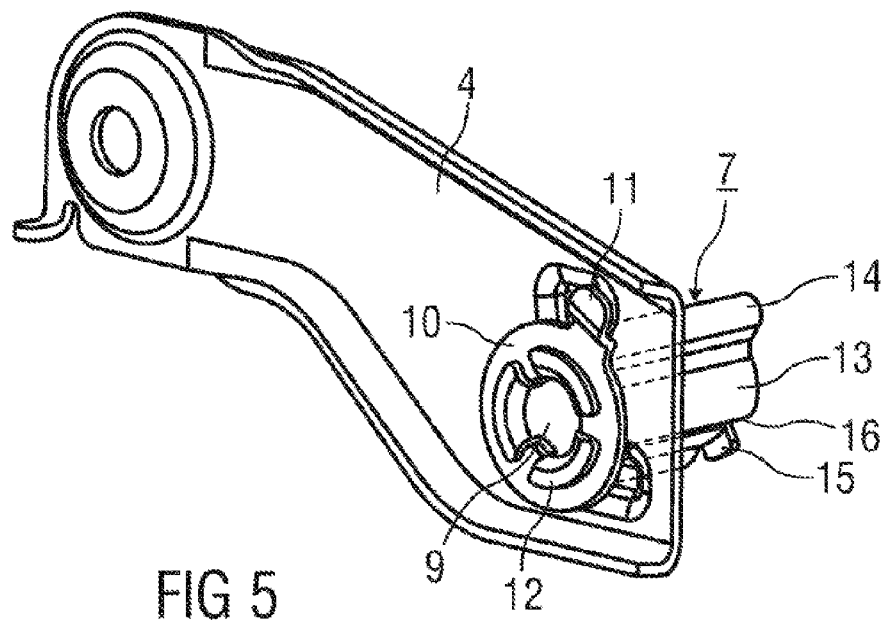
Figure 6:
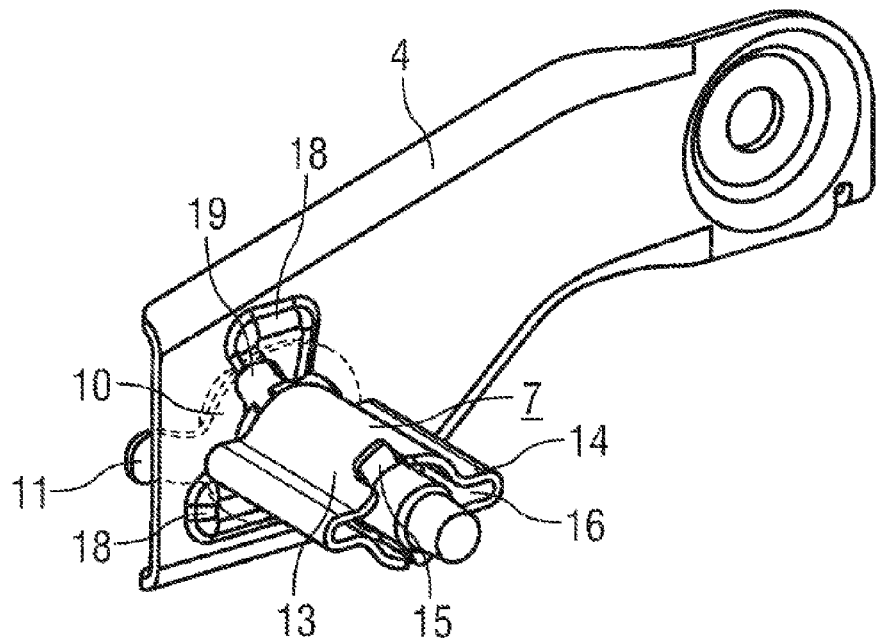
Figure 7:
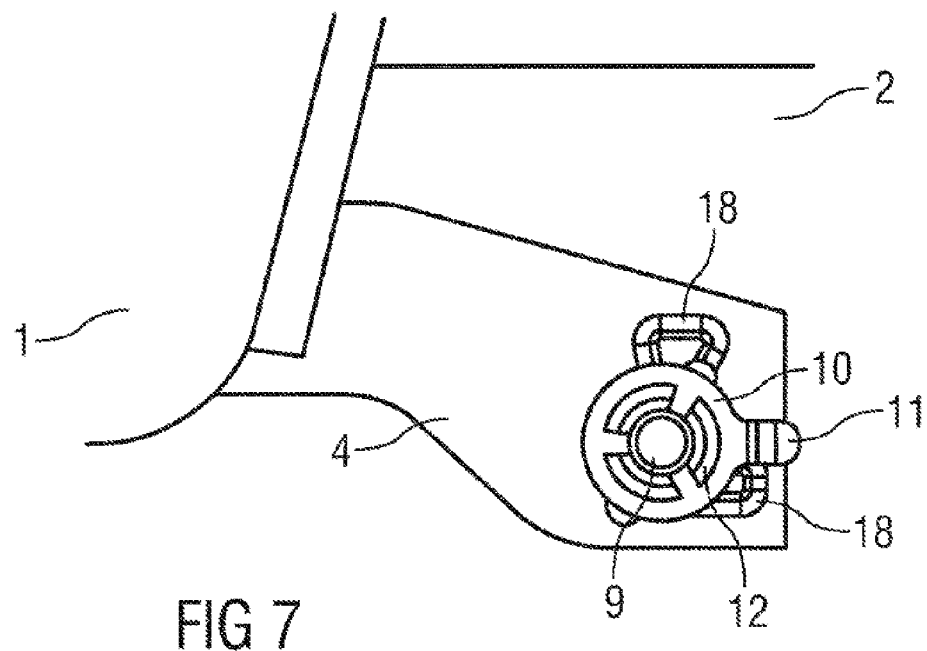
Figure 8:
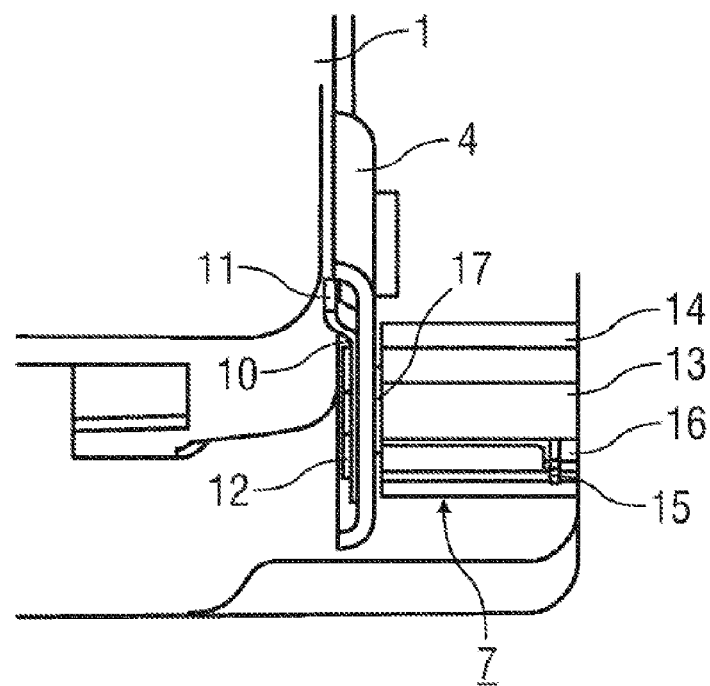
Figure 9:
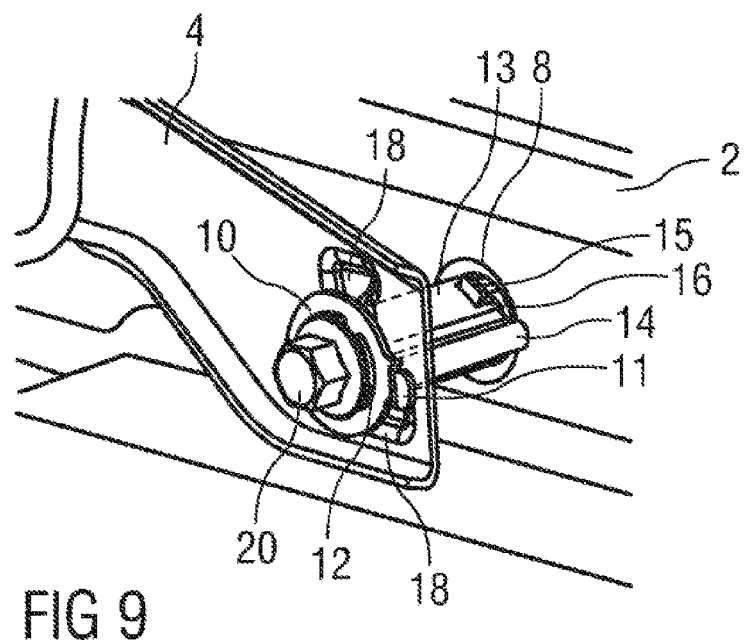

The invention is described in more detail with reference to the accompanying schematic figures, in which:

FIG. 1 shows schematically a side view of an arrangement of a vehicle seat on a vehicle structure, FIG. 2 shows schematically a detailed view of an arrangement of a vehicle seat on a vehicle structure, FIG. 3 shows schematically a further detailed view of an arrangement of a vehicle seat on a vehicle structure, FIG. 4 shows schematically a side view of an attachment element arranged in a retaining element of a vehicle seat in a first position, FIG. 5 shows schematically a perspective view of an attachment element arranged in a retaining element of a vehicle seat in a second position, FIG. 6 shows schematically a perspective view of an attachment element arranged in a retaining element of a vehicle seat in a third position, FIG. 7 shows schematically a front view of an attachment element arranged in a retaining element of a vehicle seat in a third position, FIG. 8 shows schematically a side view of an attachment element arranged in a retaining element of a vehicle seat in a second position, and FIG. 9 shows schematically a perspective view of an attachment element fixed by means of an attachment means to the vehicle structure and retaining element.

Parts which correspond to one another are provided in all the figures with the same reference numerals.

FIG. 1 shows schematically a side view of an arrangement of a vehicle seat 1 on a vehicle structure 2. Such a conventional vehicle seat is fixed at its front end 3 to the vehicle structure 2 in the conventional manner when mounted in the vehicle. Subsequently, a rear end of the vehicle seat 1 which preferably is formed from a retaining element 4, is pivoted into the mounting position so that a rear foot portion 5 bears against a vehicle floor 6.

In order not to hinder said pivoting movement of the vehicle seat 1 during mounting or simply to permit said pivoting movement, a predeterminable spacing A is formed between the vehicle structure 2 and the retaining element 4.

FIG. 2 shows schematically a detailed view of an arrangement of the vehicle seat 1 on the vehicle structure 2. In this case, for compensating for the spacing A between the vehicle structure 2 and the retaining element 4, an attachment element 7 according to the invention is arranged in the retaining element 4 of the vehicle seat 1 and the attachment element 7 is arranged in a first position.

The attachment element 7 comprises a sleeve 9, on one end of which a lever element 10 is arranged. The lever element 10 in this case is configured to be substantially disk-shaped and on the outer periphery has a lever-like extension 11.

The lever element 10 is arranged positively and/or non-positively on the sleeve 9, for which corresponding portions 12, for example, are integrally formed or shaped at the end face of the sleeve 9 and bent back outwardly at an angle of 90 degrees or almost 90 degrees relative to the sleeve axis.

At the other end of the sleeve 9, an element 13 which is configured substantially in the manner of a hollow cylinder is arranged. Said element 13 at least partially surrounds the sleeve 9. Moreover, on the element 13 configured in the manner of a hollow cylinder, two wing-like extensions 14 opposing one another are formed.

In this case, the element 13 configured in the manner of a hollow cylinder is retained positively and/or non-positively by means of two retaining tabs 15 retained on the sleeve 9 opposing one another. Said retaining tabs 15 are integrally formed or shaped on the front face of the sleeve 9 and bent back outwardly at an angle of 90 degrees or almost 90 degrees relative to the sleeve axis. In this case, the retaining tabs 15 engage in corresponding recesses 16 in the element 13 configured in the manner of a hollow cylinder and outwardly protrude over the element 13.

An intermediate space 17 is formed between the lever element 10 and the element 13 configured in the manner of a hollow cylinder, said intermediate space being configured so as to correspond to a material thickness of the retaining element 4 of the vehicle seat 1.

When mounting the vehicle seat on the vehicle structure 2, the attachment element 7 is arranged in a first position in which the element 13 configured in the manner of a hollow cylinder with the wing-like extensions 14 is arranged in a correspondingly shaped recess 19 of the retaining element 4 of the vehicle seat 1. In the first position, the retaining tabs 15 of the sleeve 9 bear against the retaining element 4 of the vehicle seat 1.

An attachment portion 8 is formed in the vehicle structure 2, said attachment portion, for example, being shaped as a conventional threaded portion.

FIG. 3 shows schematically a further detailed view of an arrangement of the vehicle seat 1 on the vehicle structure 2.

FIG. 4 shows schematically a side view of the attachment element 7 arranged in the retaining element 4 of the vehicle seat 1 in a first position.

FIG. 5 shows schematically a perspective view of the attachment element 7 arranged in the retaining element 4 of the vehicle seat 1 in a second position. For the transition from the first position into the second position, the attachment element 7 is displaced in the vehicle transverse direction in the direction of the vehicle structure 2, so that the lever element 10 bears against the retaining element 4 of the vehicle seat 1. Thus, the element 13 configured in the manner of a hollow cylinder is completely moved out of the correspondingly shaped recess 19 of the retaining element 4 of the vehicle seat 1 and on its front face preferably bears against the vehicle structure 2. In this case, the recess of the retaining element 4 of the vehicle seat 1 is arranged in the intermediate space 17 between the lever element 10 and the element 13 configured in the manner of a hollow cylinder.

FIG. 6 shows schematically a perspective view of the attachment element 7 arranged in the retaining element 4 of the vehicle seat 1 in a third position. For the transition into this third position, the attachment element 7 is rotated by means of the lever element 10. As a result, the wing-like extensions 14 are moved away from the corresponding recesses 19 of the retaining element 4 of the vehicle seat 1 and bear against the retaining element 4 so that a reverse movement of the attachment element 7 in the vehicle transverse direction is prevented. In this case, retaining portions 18 which predetermine a rotational angle of the attachment element 7 may be configured on the retaining element 4 of the vehicle seat 1. Such retaining portions 18 may, for example, be configured as conventional stamped portions.

FIG. 7 shows schematically a front view of the attachment element 7 arranged in the retaining element 4 of the vehicle seat 1 in a third position.

FIG. 8 shows schematically a side view of the attachment element 7 arranged in the retaining element 4 of the vehicle seat 1 in a second position, said attachment element bearing on its front face against the vehicle structure 2.

FIG. 9 shows schematically a perspective view of the attachment element 7 fixed by means of an attachment means 20 to the vehicle structure 2 and the retaining element 4. In this case, a conventional correspondingly shaped attachment means 20, for example a screw, is inserted into the attachment element 7 rotated into the third position and screwed into the attachment portion 8 of the vehicle structure 2.

By means of the attachment means 20, the element 13 configured in the manner of a hollow cylinder is thus pressed at the end face between the vehicle structure 2 and the retaining element 4 of the vehicle seat 1, as the element 13 configured in the manner of a hollow cylinder bears with its one front face against the retaining element 4 and with its other front face against the vehicle structure 2.

In a manner not shown in more detail, the attachment element 7 is able to be displaced in the third position in the vehicle vertical axis and/or vehicle longitudinal axis. For example, a diameter of the recess 16 in the retaining element 4 is enlarged relative to an external diameter of the sleeve 9, so that the sleeve 9 is displaceable in the recess 16.

The attachment element 7 thus advantageously permits tolerance compensation when attaching the vehicle seat 1, both in the vehicle transverse axis, vehicle vertical axis and/or vehicle longitudinal axis.

LIST OF REFERENCE NUMERALS

1 Vehicle seat
2 Vehicle structure
3 Front end
4 Retaining element
5 Foot portion
6 Vehicle floor
7 Attachment element
8 Attachment portion
9 Sleeve
10 Lever element
11 Lever-like extension
12 Portion
13 Element configured in the manner of a hollow cylinder
14 Wing-like extension
15 Retaining tab
16 Recess
17 Intermediate space
18 Retaining portions
19 Recess
20 Attachment means
A Spacing

The invention claimed is:

1. An attachment element configured to mount a vehicle seat on a vehicle structure, comprising:
    a sleeve including at least two retaining tabs, wherein the at least two retaining tabs oppose one another;
    a lever element arranged at one end of the sleeve; and
    a spacing element which is configured substantially in the manner of a hollow cylinder, which comprises at least two wing-like extensions opposing one another, and which at least partially surrounds the sleeve,
    wherein the spacing element is held on the sleeve by the at least two retaining tabs such that, when arranging or mounting the vehicle seat in the vehicle, the attachment element is configured to be arranged in a first position in which the spacing element with the wing-like extensions is arranged in a correspondingly shaped recess of a retaining element of the vehicle seat,
    wherein the at least two retaining tabs of the sleeve are configured to bear against the retaining element of the vehicle seat when the attachment element is arranged in the first position.

2. The attachment element as claimed in claim 1, wherein the at least two retaining tabs are integrally formed or shaped on a front face of the sleeve and are bent back outwardly at an angle of approximately 90 degrees relative to the sleeve axis.

3. The attachment element as claimed in claim 1, wherein the at least two retaining tabs are configured to engage in corresponding recesses in the spacing element and outwardly protrude over the spacing element.

4. The attachment element as claimed in claim 1, further comprising an intermediate space between the lever element and the spacing element, wherein said intermediate space corresponds to a material thickness of the retaining element of the vehicle seat.

5. The attachment element as claimed in claim 1, wherein, for arrangement of the lever element on the sleeve, portions are integrally formed or shaped on an end face of the sleeve and are bent back outwardly at an angle of approximately 90 degrees relative to a sleeve axis.

6. The attachment element as claimed in claim 1, wherein the lever element is configured to be disk-shaped and on an outer periphery has a lever-like extension.

7. A method for positioning at least one attachment element as claimed in claim 1 in order to subsequently mount a vehicle seat on a vehicle structure by the at least one attachment element, comprising:
    arranging the attachment element in a first position in which the spacing element with wing-like extensions is arranged in a correspondingly shaped recess of the retaining element of the vehicle seat when arranging or mounting the vehicle seat in the vehicle,
    wherein the at least two retaining tabs of the sleeve of the attachment element bear against the retaining element of the vehicle seat when the attachment element is arranged in the first position.

8. The method as claimed in claim 7, further comprising displacing the attachment element in a vehicle transverse direction toward the vehicle structure into a second position until the attachment element bears on its front face against the vehicle structure according to the arrangement of the vehicle seat in the vehicle,
    wherein the spacing element with the wing-like extensions is moved completely out of the recess of the retaining element of the vehicle seat so that the recess is located in an intermediate space between the lever element and the spacing element and at least part of the lever element bears against the retaining element of the vehicle seat.

9. The method as claimed in claim 8, further comprising rotating the attachment element from the second position by the lever element manually or automatically into a third position,
    wherein the wing-like extensions bear at an end face against the retaining element of the vehicle seat, so that a return movement of the attachment element in the vehicle transverse direction is prevented.

10. The attachment element of claim 1, wherein the at least two retaining tabs are integrally formed or shaped on a front face of the sleeve and are bent back outwardly relative to the sleeve axis, and the at least two retaining tabs are configured to engage in corresponding recesses in the spacing element and outwardly protrude over the spacing element.

* * * * *